3,803,293
PROCESS FOR THE PREPARATION OF PHOSPHORIC ACID FROM UNGROUND PHOSPHATE ROCK
Donald Richard Randolph, Boutte, La., and Robert Lee Bristow, Titusville, N.J., assignors to American Cyanamid Company, Stamford, Conn.
Continuation-in-part of abandoned application Ser. No. 861,313, Sept. 26, 1969. This application May 26, 1972, Ser. No. 257,217
Int. Cl. C01b 25/16
U.S. Cl. 423—320          9 Claims

ABSTRACT OF THE DISCLOSURE

A novel multiple step process for the manufacture of wet process phosphoric acid from unground phosphate rock having a moisture content between about 3% and 15% by weight and a surface area between about 5 and 105 sq. cm./gram.

CROSS-REFERENCE TO RELATED APPLICATION

This application is a continuation-in-part of our copending application Ser. No. 861,313, filed Sept. 26, 1969, now abandoned.

BACKGROUND OF THE INVENTION

The art of producing wet process phosphoric acid from phosphate rock has been well developed over the past two decades as is evident from the plethora of patents, books, and publications directed to various process techniques, manufacturing equipment and plant designs employed in this industry. While there are many significant differences in the several areas of manufacturing mentioned above, basically, all processes for the recovery of wet process acid from phosphate rock involve treatment of the rock with a strong mineral acid such as hydrochloric, nitric, or sulfuric acid; sulfuric acid is most commonly used since it is relatively inexpensive and readily available. In such treatments, the rock is attacked by the acid which destroys the crystal lattice of the fluorapatite, the major constituent of the rock, and frees the phosphate as phosphoric acid.

In practice, phosphate rock, although abundant, has been found to vary widely in quality or impurity content; it is known that the quality of the rock can cause serious adverse effects in the production of wet process phosphoric acid. Obviously, where impurities are excessive, processing of the rock is impractical. Generally, in order to be useful for the production of wet process phosphoric acid, the rock must have a tricalcium phosphate $[Ca_3(PO_4)_2]$ content of at least about 67%. This may be expressed as 67BPL "bone phosphate of lime."

A. V. Slack in his monograph on phosphoric acid, vol. 1, part 1, p. 21, Fertilizer Science and Technology Series, entitled "Phosphoric Acid," 1968, calls attention to another extremely important characteristic of the phosphate rock employed in the manufacture of wet process acid by processes heretofore available in the art, namely, the particle size of the rock itself. Slack states: "Another important characteristic of phosphate rock is the particle size. In beneficiation, the larger sizes are screened out before flotation; although this fraction is too large in particle size for use in wet-process acid production, it is suitable for use in the furnace process for which fine rock cannot be used because it would be carried out of the furnace with effluent gases. In making wet process acid, even the fine rock recovered by flotation must be ground, usually to 75% through 200 mesh, although the particle varies widely."

A typical size distribution of ground commercial rock is given below:

SCREEN ANALYSIS

| Specified size all grades | Percent larger or smaller than indicated mesh size | | | | |
|---|---|---|---|---|---|
| | +50 | +70 | +100 | +200 | −200 |
| 85% −100 mesh | 1.5 | 5.5 | 14.0 | 25.0 | 75.0 |
| 90% −100 mesh | 1.0 | 4.0 | 10.0 | 24.1 | 75.9 |

A convenient way of establishing a relationship between varioius sizes of particulate solids is to determine the property of specific surface area using the method as outlined, for example, in section 8–7 of Chemical Engineer's Handbook, 4th ed., Perry, Chilton and Kirkpatrick, editors, McGraw-Hill Book Co., said publication incorporated herein by reference. Applying this method to the two grades of rock in the above table, the calculated specific surface areas are 374 and 382 square cm. per gram of material. With such high surface areas, this rock could only be obtained by dry grinding of the larger rock, for example, the dried flotation product from a beneficiation process or the washed and dried pebble rock.

These drying and grinding operations, which are essential to prior art processes, are of course costly from the standpoint of the inventment in drying and grinding equipment, fuel and energy input and processing time, as well as the storage facilities required for the dry ground product. It would, therefore, be most desirable if a process could be developed for the manufacture of wet-process phosphoric acid utilizing wet, unground rock.

To this end, it is an object of this invention to provide a process for the manufacture of wet-process phosphoric acid by the acid digestion of unground phosphate rock having 3% to 15% moisture content and a surface area of about 5 to 105 sq. cm./gram, said process eliminating the steps of drying and grinding the rock prior to acid treatment.

This objective is achieved by the process of the present invention which is described hereinbelow in connection with a reactor system in which the process is effectively carried out.

The conventional processes for the manufacture of wet process phosphoric acid generally produce acid, which has a free sulfuric acid content between about 2.5% and 5.0%. The sulfuric acid is an unwanted diluent that provides no nutrient value to the finished fertilizers manufactured therewith, and interferes with the manufacture of upgraded fertilizers such as diammonium phosphate, triple super phosphate and polyphosphates. In practice, it is found that the presence of high levels of sulfuric acid in the phosphoric acid makes it difficult to reach the desired level of $P_2O_5$ in the upgraded fertilizer.

SUMMARY OF THE INVENTION

This invention relates to a novel process for the manufacture of wet process phosphoric acid from unground phosphate rock. In accordance with the process of this invention, unground phosphate rock particles having a moisture content of between 3.0% and 15% and a surface area between about 5 and 105 sq. cm./gram are admixed with phosphoric acid containing less than 2.0% by weight of free sulfuric acid; the resulting mixture is then agitated whereupon additional sulfuric acid is admixed therewith in an amount sufficient to dissolve substantially all of the phosphate rock particles and to produce a phosphoric acid—dicalcium phosphate—calcium sulfate slurry containing less than 2.0% by weight of free sulfuric acid in the liquid phase. The slurry is fed to a liquid-solid separator of any convenient type (such as a centrifuge, cyclone or filter), where the wet phosphoric acid is separated from the solids which include unreacted rocks, gypsum, and the like. The acid is then pumped to storage and the remaining liquid-solid slurry fed to the second stage reactor for further treatment. The slurry is then admixed with sulfuric acid to increase the sulfuric acid concentration of the slurry to between 5% and 20%, by weight, whereupon the slurry is heated to a temperature between about 85° C. and 95° C. until the dicalcium phosphate content is reduced; the acid slurry exiting the second reactor is filtered, the calcium sulfate hemihydrate is separated from the acid liquid and sent to the gypsum pond for disposal, which the acid liquor containing from about 5% to 20% of free sulfuric acid is recycled to the first reactor.

DESCRIPTION OF THE PREFERRED EMBODIMENTS

Figure 1:
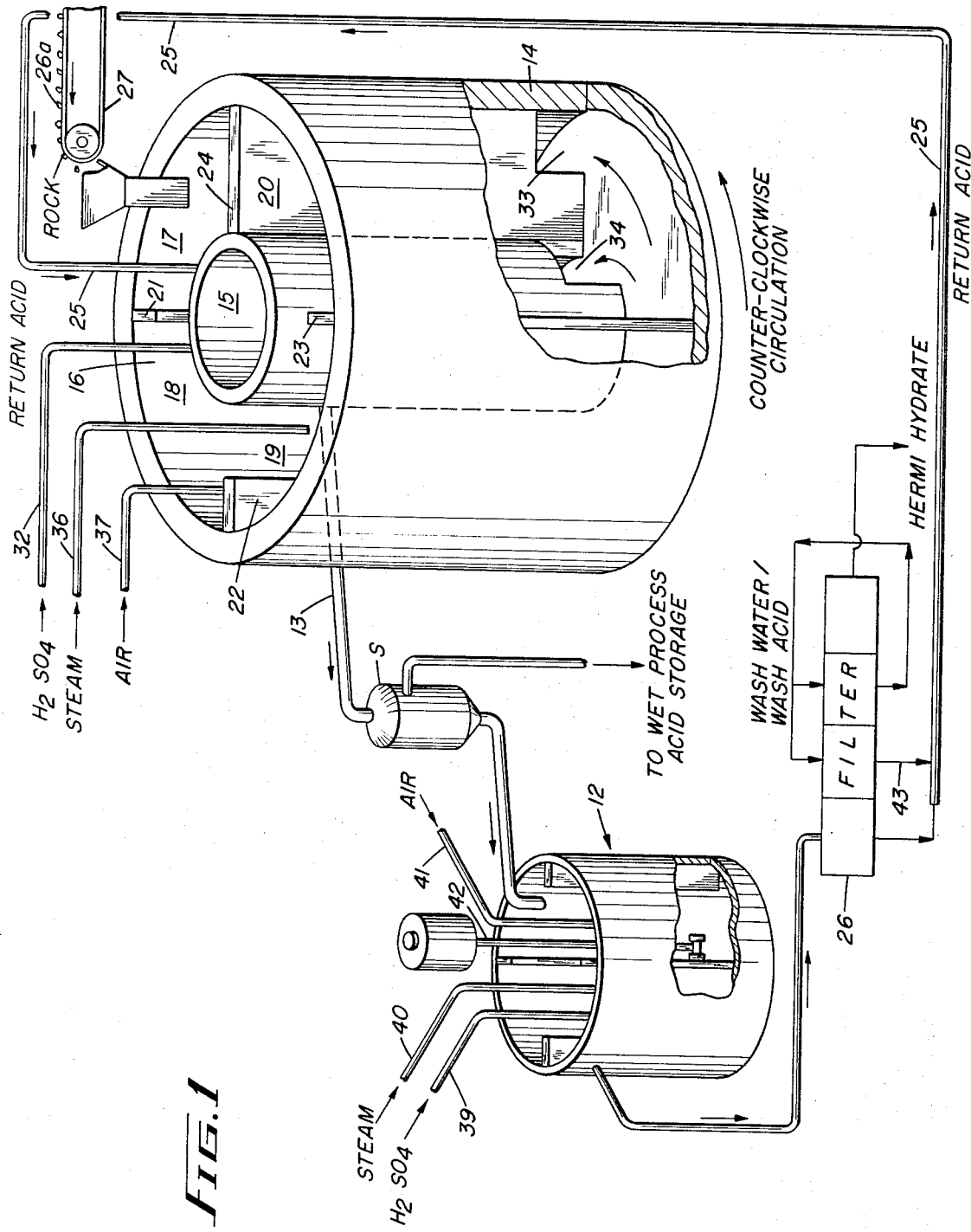
FIG. 1 is a schematic diagram showing the first and second stage reactors and a filtration system for the production of wet-process phosphoric acid in accordance with the process of this invention.

FIG. 1 depicts multicompartment first stage reaction vessel 11 and second stage reaction vessel 12, these vessels being inter-connected by conduit 13 which is provided for transporting slurry from first reactor 11 to a separator S of any desired type, such as a centrifuge or filter where product acid is recovered from the acid-gypsum unreacted rock slurry. Product acid is pumped to wet process acid storage through conduit 44. The underflow from the separator, which contains undissolved rock particles, gypsum, and the like, is pumped through conduit 13-A to the second reactor 12.

First stage reactor 11 is a cylindrical vessel having an outer wall 14 and a cylindrical central chamber 15 forming an annular chamber 16 with outer wall 14. Annular chamber 16 is divided into four continuous reaction zones 17, 18, 19 and 20 by partial baffles 21, 22 and 23 and full radial baffle 24. Zone 17 is the rock addition zone and the zone in which solution of the rock is initiated. Recycle acid 25 (i.e., crude phosphoric acid containing 5 to 20% sulfuric acid from filters 26) and/or fresh phosphoric acid plus unground phosphate rock 26a having (i) a surface area between about 5 and 105 sq. cm./g. and preferably between about 10 and 50 sq. cm./g. (calculated on the basis that each particle is a perfect sphere), and (ii) a moisture content of about 3% to 15% by weight and typically 3 to 7%, are introduced into reaction zone 17 where dissolution of a major portion of the rock is achieved. Unground rock containing at least about 65% to 79% by weight of −4 +35 mesh material is preferred.

Any convenient means may be employed for introducing the phosphate rock into the phosphoric acid slurry in initial reaction zone 17. For example, a vibrating screen or screw conveyor 27 can be used for this purpose when operated in such manner as to introduce the rock at a controlled rate.

Figure 2:
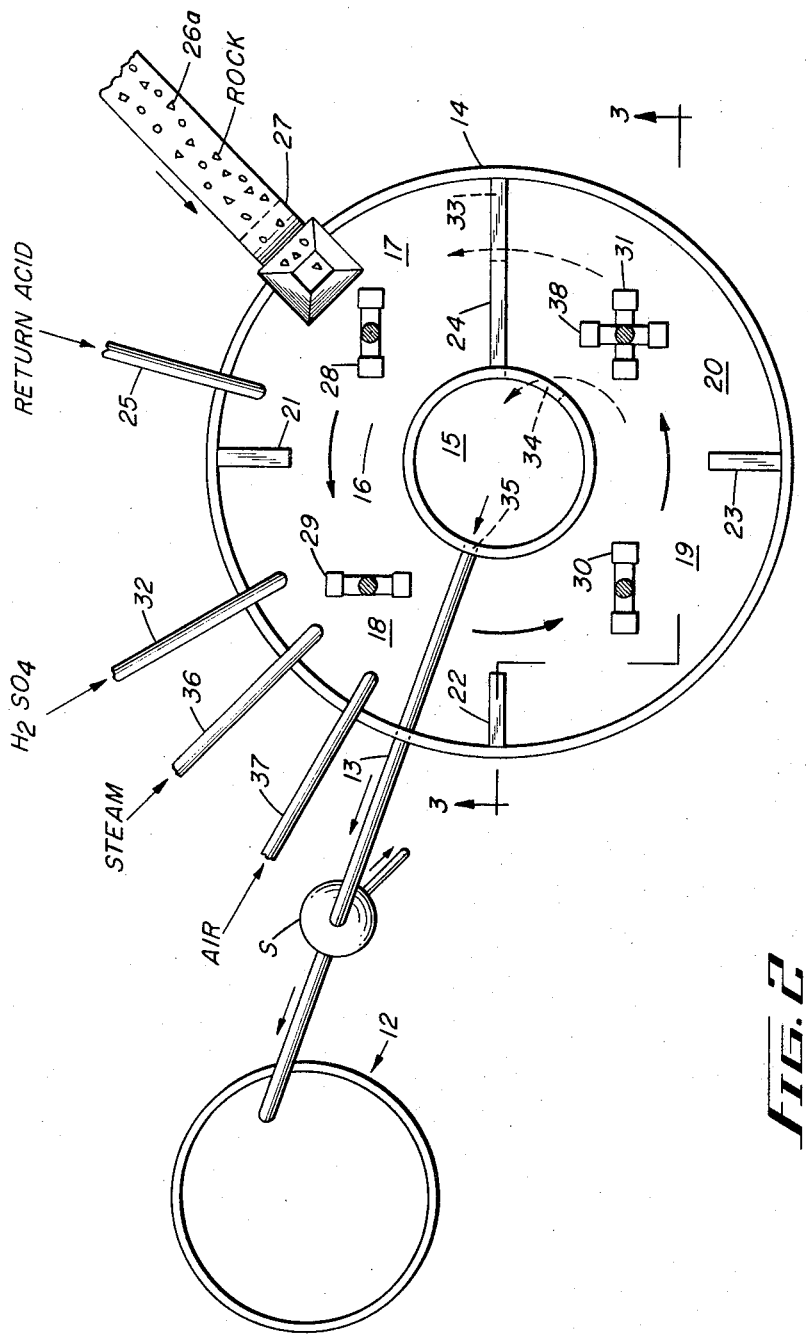
FIG. 2 is a top view of the first stage reactor.
Figure 3:
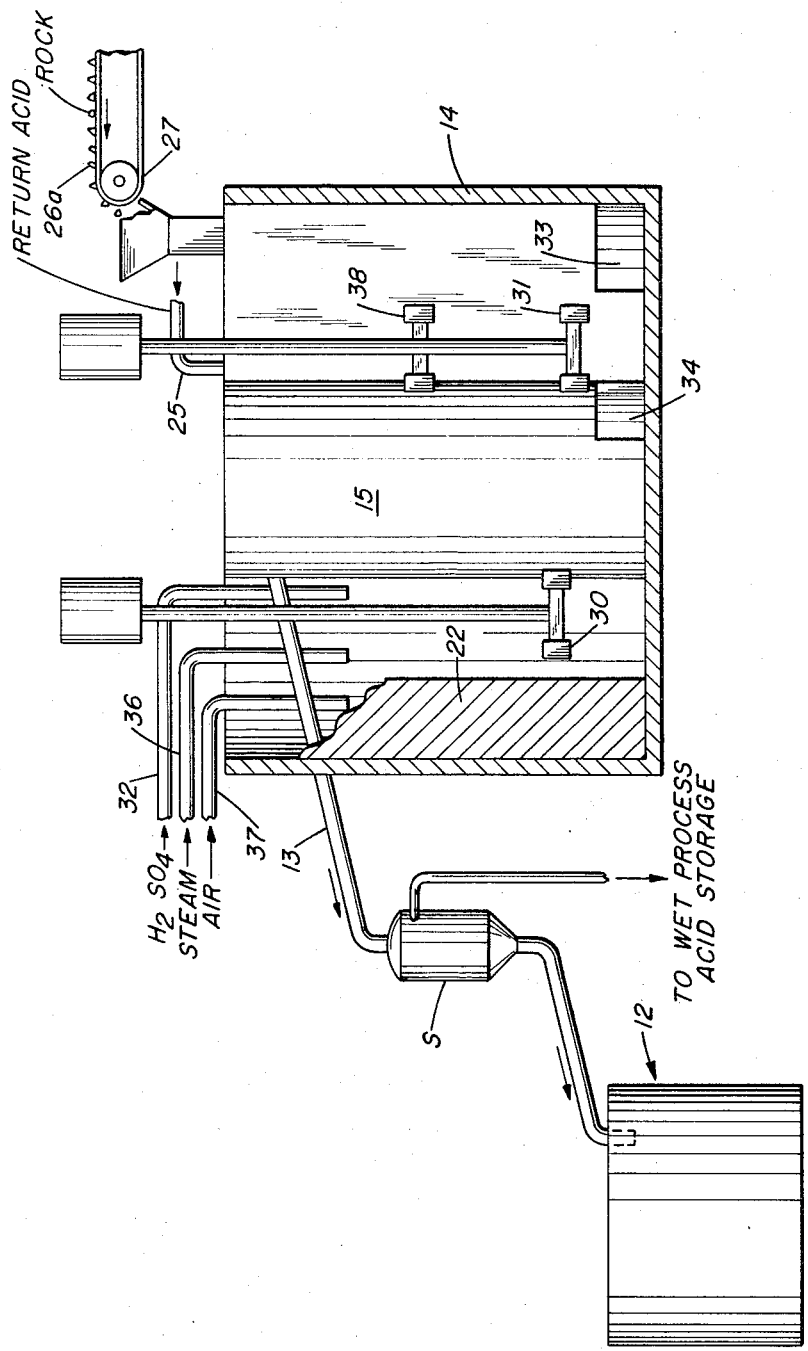
FIG. 3 is a sectional view of the first stage reaction taken along the line 3—3 of FIG. 2.

Each compartment or zone is equipped with agitator means 28, 29, 30 and 31 as shown in FIGS. 2 and 3 to maintain the acid—rock slurry in suspension and moving in a generally counterclockwise direction within each zone and through reactor 11. In operation, phosphoric acid—rock slurry is circulated by agitator 28 from rock addition zone 17 to sulfuric acid addition zone 18 where sulfuric acid 32 is introduced. The slurry is then circulated through zone 19 into zone 20, the terminal zone of first stage reactor 11. At this point, preferably about 90% by weight of the rock particles introduced are dissolved. Undissolved rock and slurry are recycled from zone 20 to zone 17 (the rock addition and initial reactor zone) through port 33 in radial baffle 24.

In the preferred apparatus, port 33 is located at the bottom of baffle 24 adjacent vessel wall 14. This arrangement is especially advantageous since it permits the crude phosphoric acid slurry containing undissolved rock particles to circulate back to initial reaction zone 17. As indicated, circulation within vessel 11 is counterclockwise with the heavier particles generally being moved along outer wall 14 of reactor 11.

The reaction which takes place in zones 17 through 20 between the phosphate rock, phosphoric acid, and sulfuric acid, produces a slurry comprising essentially phosphoric acid, dicalcium phosphate and calcium sulfate.

This slurry enters chamber 15 of first stage reactor 11 through port 34 in the bottom wall of chamber 15 and is withdrawn from the top of chamber 15 and passed to second stage reactor 12 via conduit 13.

Weir 35 and conduit 13 provided in the upper wall of chamber 15 connect chamber 15 with a separator S, preferably a centrifuge or filter, where the wet process phosphoric acid produced in the first-stage reactor is separated from undissolved rock, gypsum, and any other solids present in the reaction mixture. The acid from the reaction mixture, which contains at least about 30% to 32% $P_2O_5$ and less than 2% free sulfuric acid, is then pumped through conduit 44 to wet process acid storage. The liquid-solid slurry from the separator S is passed to the second-stage reactor 12 through conduit 13-A.

In a continuous operation, slurry withdrawal is, of course, at a rate equivalent to the rate of introduction into the reactor of the sum of the individual components introduced.

The reaction occurring in stage one reactor 11 is exothermic and generally will not require additional heat. However, since slurry temperature is critical and must be maintained throughout the first stage reactor 11 at between about 70° and 84° C., and preferably between 75° and 84° C., reactor vessel 11 is equipped with steam line 36 and air line 37. As such, it is then possible to heat or cool the reaction slurry using steam or air, respectively, and to operate the reactor at subatmospheric, superatmospheric or standard pressure whichever is desired. If temperature is excessive in this stage, blinding of the rock occurs and dissolution of the rock particles ceases. If the temperature is permitted to fall below about 70° C., dissolution of rock is poor and citrate insoluble losses of $P_2O_5$ are very high.

Also in accordance with the present invention, where an unground rock having a moisture content of from 3% to 15% and a surface area between 5 and 105 sq. cm./g. is used as feed in the manufacture of wet process phosphoric acid, it is essential to maintain the rock particles in suspension or constant motion in the reaction slurry. To this end and as shown in FIGS. 2 and 3, reaction zones 17, 18, 19 and 20 are equipped with agitators 28 through 31, respectively. The impellers of these agitators are generally located in the lower third of the reactor and preferably just above the bottom or floor thereof. If desired, a second impeller, such as illustrated at 38, may also be arranged on the impeller shaft above primary impeller 31 as shown in FIG. 3.

In addition to the decisive parameters of reaction temperature and agitation, concentration of sulfuric acid in the slurry of reactor 11 is also critical. It was found that if the free sulfuric acid in the liquid phase rises above 2.0%, a coating of calcium sulfate forms on the surface of the rock particles thereby preventing further rock attack by the mixed phosphoric and sulfuric acids. At high sulfate levels, a very high citrate insoluble $P_2O_5$ loss (as unreacted rock) occurs. Low sulfate levels in the first reaction stage are therefore essential; preferably the liquid phase of reactor 11 will contain less than 1.5% by weight free sulfuric acid and typically from 0.1% to 1.5% by weight. However, as a consequence of this very low sulfate level there is a significant entrapment of $P_2O_5$ occurring via the mechanism known as lattice inclusion or isomorphic cocrystallization. In this instance HPO₄=ions ("dical") substitute in the calcium sulfate crystal lattice and calcium phosphate is coprecipitated with calcium sulfate. Therefore, if the process were terminated at this stage such coprecipitation would constitute a substantial loss of $P_2O_5$. However, it has been found that this phosphate loss can be avoided by subjecting the thus formed slurry to a separation treatment where the wet process phosphoric acid is recovered and sent to storage as product acid and the remaining liquid-solid slurry is subjected to a second stage treatment involving a high sulfate, high temperature reaction.

Slurry exiting from first stage reactor 11 generally has a particle density between about 2.0 and 3.0 g./cc. and preferably between 2.4 and 2.85 g./cc.; solids concentration is between about 20% and 60% and preferably between 30% and 50%; the liquid phase density may range between 1.0 and 2.25 g./cc. but is preferably maintained at 1.25 to 1.50 g./cc. at 60° F. and the average particle size of the slurry solids is between about 4 mm. and 10 microns and preferably 3 mm. to 25 microns.

This slurry is fed to the separator S where the product acid is separated from the slurry and the remaining slurry fed through conduit 13–A to second stage reactor 12 which is equipped with sulfuric acid, steam and air conduits 39, 40 and 41, respectively, and agitator 42. Sulfuric acid is admixed with the slurry in baffled reactor 12 in sufficient amount to raise the free sulfuric acid in the liquid phase to between 5% and 20% by weight and preferably to from 10% to 15%. The mixture is continuously stirred and the temperature thereof is increased to between 85° C. and 95° C. and preferably to 85° C. to 90° C. until substantially all of the "dical" $P_2O_5$ is extracted from the crystal lattice. In practice the "dical" level in the slurry exiting second stage reactor 12 is generally below about 1.5% and is preferably below 0.9% with optimum $P_2O_5$ recovery being obtained with this "dical" level below about 0.5%.

Slurry from second stage reactor 12 is then subjected to a clarification treatment where slurry solids, i.e., primarily calcium sulfate hemihydrate, are separated from the wet process phosphoric acid. Separation may be accomplished by any convenient means such as the filtration apparatus 26 as shown in FIG. 1, by centrifugation, or the like.

The acid is recycled to first-stage reactor 11 along with dilute acid 43 from the wash cycle of filter 26.

The advantages obtained in the use of the process of the present invention as indicated above are multiple. In addition to eliminating the drying and grinding steps and the equipment necessary to carry out these functions, the present process also eliminates the need for specially constructed ground rock storage silos which are equipped with aerators to prevent compaction of the ground rock. The present process also has the advantage of ease of temperature control in the first stage reactor whereas, with ground rock, the surface area of the rock particles is so extensive and the exotherm occurring in the acid-rock reaction so substantial that temperature control is difficult to obtain.

An additional advantage of the process of the present invention is the unexpectedly high percent recovery of $P_2O_5$ from the unground rock.

It is also readily apparent that the process of this invention provides a most convenient method for the continuous production of wet phosphoric acid from unground phosphate rock.

Although the reactor system described hereinabove incorporates several features which contribute to the satisfactory operation of the process, the geometry of the system depicted in FIGS. 1, 2 and 3 is not especially critical; other reactor systems well-known in the field contain features in common with this system. Such other systems could be readily modified to provide the features of the reactor system such as efficient dispersion of reactants, high rate of slurry recycle, suspension of even the coarsest rock presented to the system and proper acid concentrations. The process of this invention is not therefore limited to the design of the particular system shown but may be used with any system that provides the conditions necessary for the satisfactory operation thereof.

The present invention is further illustrated by the examples provided below.

EXAMPLE 1

Employing the equipment illustrated in FIGS. 1, 2 and 3 above, two week-long runs with wet, unground phosphate rock having 7% moisture and the following analysis, were performed in accordance with the process of the present invention.

ROCK ANALYSIS

| | Run 1 | Run 2 |
|---|---|---|
| $P_2O_5$ | 31.58 | 31.75 |
| BPL | 69.0 | 69.4 |
| $Fe_2O_3$ | 1.7 | 1.54 |
| $Al_2O_3$ | 0.72 | 0.82 |
| Insolubles | 6.00 | 6.57 |
| CaO | 47.32 | 47.16 |
| Screen size—cumulative, percent: | | |
| +6 | 16.3 | 5.6 |
| +8 | 35.1 | 15.4 |
| +10 | 64.1 | 43.5 |
| +12 | 76.6 | |
| +14 | 86.7 | 79.0 |
| +20 | 95.6 | 95.9 |
| +35 | 98.8 | 99.2 |
| +100 | 99.7 | 99.5 |
| −100 | 0.3 | 0.5 |
| Surface area of rock particles, cm.²/gm | 14 | 17 |

This area is calculated on the assumption that each particle is a perfect sphere.

In these tests, run-of-pile wet, unground phosphate rock was continuously introduced into the rock addition compartment of the 13 gallon first stage reactor at the rate of about 50.5 g. of rock per minute and admixed with approximately 93 cc. per minute of return acid (i.e., crude phosphoric acid) from the process. Two downward thrusting axial flow impellers, 3" diameter, 3" apart and 3" above the vessel base maintained the slurry in constant motion and moved the slurry into the acid addition compartment where approximately 23.7 cc. per minute of concentrated sulfuric acid were admixed with the slurry. A 3" radial flow turbine arranged 3" above the base maintained the slurry in a state of agitation and moved the slurry into the final two compartments which were equipped with 3" diameter radial flow turbines. Slurry containing undissolved rock particles was circulated back to the rock addition compartment through the port in the base of the full radial baffle separating the first and last zones. Phosphoric acid-calcium phosphate-calcium sulfate slurry was drawn into the central compartment which was equipped with two 2" diameter propellers. All stirrers were connected via pulleys to a variable speed ½ HP motor and operated at about 600 r.p.m.

Samples of slurry in this first reactor had an average particle density of about 2.65 g./cc.; the solids concentration ranged from 33 to 45%; the liquid phase density was from 1.30 to 1.44 g./cc. at 60° F. and the particle size ranged from 4 mm. to 10 microns.

The temperature of the slurry in this reactor was maintained throughout between about 80° and 84° C.; free sulfuric acid ranged from 0.3 to 1.3%, $P_2O_5$ was about 30–34% and dilution ratio was from about 1.7 to 2.2.

The phosphoric acid—calcium phosphate—calcium sulfate slurry was continuously withdrawn from the central chamber of this first stage reactor and sent to a second reaction vessel where sulfuric acid was admixed therewith in sufficient amount to increase the acid concentration thereof to about 10% to 15%. The reaction was exothermic and the temperature of the slurry increased to and was maintained at from 85° C. to 90° C. Stirring of the slurry was continuous. Slurry from this reactor was then filtered, the gypsum cake washed with water and a portion of the acid recycled to the rock addition zone. Typical experimental data obtained by sampling at intervals throughout the test runs and in various zones of the reactors is provided in Table I below. Table II provides experimental data obtained from slurry samples exiting the first and second reactors.

TABLE I

| Reactor | Percent $P_2O_5$ | Percent $H_2SO_4$ | Percent $CI^1$ | Percent Dical |
|---|---|---|---|---|
| 1 | 27.57–33.49 | 0.00–3.30 | 0.07–3.05 | 0.63–2.09 |
| 2 | 25.30–32.82 | 0.00–14.87 | 0.15–1.77 | 0.00–2.08 |
| 1 | 24.36–32.01 | 0.00–2.35 | 0.04–2.14 | 0.09–10.33 |
| 2 | 23.34–25.03 | 1.78–17.76 | 0.04–0.72 | 0.31–2.44 |

TABLE II

| | Acid (percent) | | Gypsum (percent) | | Recovery |
|---|---|---|---|---|---|
| | $P_2O_5$ | $H_2SO_4$ | $CI^1$ | Dical | |
| Exit—First reactor | 29.41 | 0.00 | 0.86 | 2.09 | 86.7 |
| Exit—Second reactor | 28.31 | 5.04 | 0.23 | 0.14 | 98.3 |
| Exit—First reactor | 29.67 | 0.89 | 0.11 | 0.84 | 95.7 |
| Exit—Second reactor | 29.70 | 5.97 | 0.34 | 0.52 | 96.1 |
| Exit—First reactor | 26.19 | 0.17 | 0.06 | 3.43 | 84.3 |
| Exit—Second reactor | 23.93 | 5.24 | 0.02 | 0.84 | 96.0 |
| Exit—First reactor | 27.57 | 0.31 | 0.21 | 2.22 | 89.1 |
| Exit—Second reactor | 22.07 | 8.23 | 0.01 | 0.59 | 97.3 |

[1] Citrate insolubles.

EXAMPLE 2

The critical nature of temperature control in the first stage reactor is demonstrated by the following tests wherein phosphate rock having the following analysis:

| Chemical analysis, percent | Screen analysis | | Surface area, cm.$^2$/gm. |
|---|---|---|---|
| 31.75 $P_2O_5$ | 5.6 | +6 | |
| 69.4 BPL | 15.4 | +8 | |
| 1.54 $Fe_2O_3$ | 43.5 | +10 | |
| 0.82 $Al_2O_3$ | | +12 | 17 |
| 6.57 Insolubles | 79.0 | +14 | |
| 47.16 CaO | 95.9 | +20 | |
| | 99.2 | +35 | |
| | 99.7 | +100 | |
| | 0.3 | −100 | | is introduced into zone 17 of reactor 11 in FIG. 1 at the rate of 50.5 g./min. Recycle acid is introduced into the reactor at the rate of 50 cc./min. and 25 cc./min. of sulfuric acid is admixed with the slurry in zone 18. Samples of exiting slurry from the first stage reactor are taken at intervals and analyzed. These data are reported in Table III and show that proper slurry temperature in the first stage reactor is essential to the process of the present invention.

TABLE III.—ANALYSIS OF SLURRY EXITING REACTOR

| | Liquid phase (percent) | | Solid phase (percent) | |
|---|---|---|---|---|
| Slurry temperature | $P_2O_5$ | $H_2SO_4$ | CI | Dical |
| 70–75° C | 17.79 | 13.18 | 4.94 | 2.67 |
| 75–84° C | 24.46 | 0 | 0.35 | 0.92 |
| 85–90° C | 27.57 | 0 | 0.07 | 1.99 |

EXAMPLE 3

The importance of $H_2SO_4$ acid concentration in the first stage reactor is shown by the following tests where phosphate rock having a surface area of 42 cm.$^2$/gm. is treated in accordance with the process of the present invention in the first stage reactor. Rock, recycle acid and sulfuric acid are introduced into the reactor at the rate of 50.5 g./min., 50 cc./min. and 25 cc./min. respectively. Reaction temperature is maintained between 75 and 84° C. and slurry exiting the reactor is analyzed. The adverse effects of high sulfuric acid concentration in this reaction can be seen by referring to the results of these tests reported in Table IV below

TABLE IV

| $H_2SO_4$ conc. | $P_2O_5$ | Gypsum (percent) | | Recovery |
|---|---|---|---|---|
| | | CI | Dical | |
| 0.08 | 27.81 | .01 | .55 | 97.48 |
| 1.19 | 27.43 | .02 | .23 | 98.88 |
| 2.56 | 25.05 | .43 | .29 | 98.70 |

EXAMPLE 4

The critical nature of sulfuric acid concentration in the second stage reactor is demonstrated by the following tests wherein phosphoric acid-dicalcium phosphate-calcium sulfate slurry prepared in accordance with the process of the instant invention is treated with various concentrations of sulfuric acid. Samples are taken at intervals during the reaction and analyzed. The results demonstrate that acid concentrations below about 5% in the second stage reaction are unsatisfactory.

TABLE V

| Slurry temperature | $H_2SO_4$ conc., percent | $P_2O_5$, percent | Gypsum, percent | |
|---|---|---|---|---|
| | | | CI | Dical |
| 85–95° C | 1.54 | 27.44 | 1.55 | 1.11 |
| 85–95° C | 6.17 | 25.65 | .15 | .39 |
| 85–95° C | 11.72 | 15.82 | .23 | .14 |
| 85–95° C | 14.87 | 25.30 | .28 | .33 |

EXAMPLE 5

The unusually high recovery of $P_2O_5$, employing the process of the present invention, from the wet unground rock is demonstrated below wherein a phosphate rock containing 5.00% $H_2O$ by weight and having the following analysis:

Mesh size:                 Percent by wt.
+10 —————————————— 0.89
−10 +18 —————————————— 18.68
−18 +30 —————————————— 41.47
−30 +100 —————————————— 22.42
−100 +200 —————————————— 10.18
−200 —————————————— 6.36

Surface area: 84 cm.$^2$/gm.

is treated in accordance with the procedure of Example 1 wherein the temperature of the slurry exiting the first vessel is approximately 72° C. and is passed to the second vessel maintained at about 85° C. The process is run continuously for 24 hours and the product analyzed. These results are provided below:

Total $P_2O_5$ in cake: 0.20–0.45
Insoluble $P_2O_5$ in cake: 0.12–0.40
Overall recovery $P_2O_5$: 99.2–98.25%

We claim:
1. A process for the preparation of wet process phosphoric acid from unground phosphate rock having at least about 65% by weight of −4 +35 mesh particles comprising:
  (1) admixing in a first stage reactor unground phosphate rock particles having
    (i) a moisture content of from 3% to 15% by weight, and
    (ii) a surface area of from about 5 to 105 sq. cm./gram
  with a sufficient amount of phosphoric acid and sulfuric acid to dissolve substantially all of said rock particles;
  (2) maintaining said rock particles in motion to produce a suspension of said particles in the thus formed reaction mixture;
  (3) maintaining the average free sulfuric acid in the liquid phase of said reaction mixture below about 2.0%;

(4) maintaining the temperature of said reaction mixture between about 70° C. and 84° C. and thereby obtaining a phosphoric acid-dicalcium phosphate-calcium sulfate slurry containing less than 2.0% free sulfuric acid in the liquid phase; then (4a) passing said slurry to a separator, and separating wet process phosphoric acid therefrom;

(4b) recovering said wet process phosphoric acid as desired product; and (4c) feeding the remaining liquid-solid slurry from said separator to a second-stage reactor; then (5) in a second stage reactor, admixing sulfuric acid with the thus formed slurry to increase the concentration thereof in said slurry to between about 5% and 20%; and (6) heating said slurry to a temperature between about 85° C. and 95° C. and thereafter separating phosphoric acid from said slurry and recycling said acid to the first-stage reactor.

2. A process according to claim 1 wherein the moisture content of the rock is from about 1% to 15% by weight.

3. A process according to claim 2 wherein the phosphate rock particles have a surface area between about 10 and 50 sq. cm./g.

4. A process according to claim 2 wherein the free sulfuric acid content in the liquid phase of the first stage reactor is between about 0.1% and 1.5%, the slurry temperature is maintained at 75° C. to 84° C., the free sulfuric acid content in the second stage reactor is maintained from 10% to 15% and the slurry temperature is between 85° C. and 90° C.

5. A process according to claim 2 wherein the slurry exiting the first stage reactor has a particle density between 2.0 and 3.0 g./cc., the solids concentration is between 20% and 60% and the average particle size of the slurry solids is from 1 mm. to 25 microns.

6. A process according to claim 4 wherein the unground rock contains at least about 79% by weight of —4 +35 mesh particles.

7. A continuous process for the preparation of wet process phosphoric acid from unground phosphate rock having at least about 65% by weight of —4 +35 mesh particles comprising the steps of:

(1) continuously introducing unground phosphate rock particles having
  (i) a moisture content between 3% and 15% by weight, and
  (ii) a surface area of from 5 to 105 sq. cm./gram
into a first reaction zone and admixing said rock particles with a phosphoric acid solution containing less than 1.5% by weight of free sulfuric while maintaining the temperature of the thus formed slurry between 75° C. and 84° C. and continuously agitating the thus formed reaction mixture to maintain substantially all of said rock particles in suspension in said mixture;

(2) continuously moving the thus formed slurry into a second reaction zone and admixing therewith a sufficient amount of sulfuric acid to dissolve substantially all of said rock particles, maintaining the temperature of the slurry in said second zone between about 75° C. and 84° C. and agitating the slurry in said second zone with sufficient force to maintain substantially all of said rock particles in suspension in said zone;

(3) continuously agitating the slurry from said second zone while maintaining the temperature thereof between 75° C. and 84° C. until at least about 90% by weight of the rock particles introduced are dissolved;

(4) continuously recycling slurry containing undissolved rock particles to the said first reaction zone;

(5) continuously withdrawing the phosphoric acid-dicalcium phosphate—calcium sulfate slurry formed by the above said reactions;

(5a) continuously moving the thus formed slurry into a separation zone;

(5b) separating wet process phosphoric acid from said slurry;

(5c) continuously moving said separated acid to an acid storage zone;

(5d) continuously removing the remaining slurry from the separation zone and (6) continuously introducing said withdrawn phosphoric acid-dicalcium phosphate-calcium sulfate slurry into a third reaction zone, admixing sulfuric acid with said slurry in said third reaction zone to increase the concentration thereof to between 5% and 20%, heating said acidified slurry to 85° C. to 95° C., and agitating said slurry under the above said conditions until the dicalcium phosphate content thereof is less than about 0.9% by weight, and separating a sulfuric acid-phosphoric acid mixture from said solids and (7) recycling said sulfuric acid-phosphoric acid mixture to said first stage reactor.

8. A process according to claim 7 wherein the phosphate rock particles have a surface area between 10 and 50 sq. cm./g.

9. A process according to claim 7 wherein the moisture content of the rock is between 3% and 15%.

References Cited

UNITED STATES PATENTS 2,850,358   9/1958   Reere.
3,420,638   1/1969   Cutter et al.
2,531,977   11/1950  Hammaren et al.

FOREIGN PATENTS 1,556,482   12/1968   France.

OSCAR R. VERTIZ, Primary Examiner
G. HELLER, Assistant Examiner

U.S. Cl.. X.R.
423—167